(12) United States Patent
Aga et al.

(10) Patent No.: US 10,603,614 B2
(45) Date of Patent: *Mar. 31, 2020

(54) FERRITE PARTICLES HAVING OUTER SHELL STRUCTURE USED FOR FILTERING MEDIUM

(71) Applicant: POWDERTECH CO., LTD., Chiba (JP)

(72) Inventors: Koji Aga, Chiba (JP); Takao Sugiura, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/545,521

(22) PCT Filed: Jan. 25, 2016

(86) PCT No.: PCT/JP2016/052030
§ 371 (c)(1),
(2) Date: Jul. 21, 2017

(87) PCT Pub. No.: WO2016/121699
PCT Pub. Date: Aug. 4, 2016

(65) Prior Publication Data
US 2018/0008921 A1    Jan. 11, 2018

(30) Foreign Application Priority Data
Jan. 28, 2015    (JP) .................. 2015-013796

(51) Int. Cl.
*B01J 20/02*         (2006.01)
*B01D 39/06*        (2006.01)
(Continued)

(52) U.S. Cl.
CPC .............. *B01D 39/06* (2013.01); *B01J 20/06* (2013.01); *B01J 20/28004* (2013.01);
(Continued)

(58) Field of Classification Search
CPC . B01D 39/06; B01J 20/3078; B01J 20/28004; B01J 20/28016; B01J 20/3021;
(Continued)

(56) References Cited

U.S. PATENT DOCUMENTS 4,382,982 A    5/1983    Whillans
5,039,559 A    8/1991    Sang et al.
(Continued)

FOREIGN PATENT DOCUMENTS

CN    103046138 A  *  4/2013
EP    0918045 A1    5/1999
(Continued)

OTHER PUBLICATIONS

Jing et al. "Magnetic Core-Shell Nano-TiO2/Al2O3/NiFe2O4 Microparticles with Enhanced Photocatalytic Activity" Journal of Nanoscience and Nanotechnology vol. 13, 4949-4953, 2013 (Year: 2013).*
(Continued)

*Primary Examiner* — Haytham Soliman
(74) *Attorney, Agent, or Firm* — Greenblum & Bernstein, P.L.C.

(57) ABSTRACT

An object of the present invention is to provide ferrite particles for a filtering medium excellent in filtration ability having a small apparent density, capable of various properties maintained in the controllable state and filling a specified volume with a small amount, and a filtering medium made from the ferrite particles. In order to achieve the object, ferrite particles provided an outer shell structure
(Continued)

ELECTRON BEAM IMAGE 8 containing Ti oxide for a filtering medium, and a filtering medium made from the ferrite particles are employed.

9 Claims, 4 Drawing Sheets

(51) Int. Cl.
  *B01J 20/06* (2006.01)
  *C01G 49/00* (2006.01)
  *H01F 1/11* (2006.01)
  *C04B 35/628* (2006.01)
  *B01J 20/28* (2006.01)
  *B01J 20/30* (2006.01)
  *B01J 20/32* (2006.01)

(52) U.S. Cl.
  CPC ..... *B01J 20/28016* (2013.01); *B01J 20/3021* (2013.01); *B01J 20/3028* (2013.01); *B01J 20/3042* (2013.01); *B01J 20/3078* (2013.01); *B01J 20/3204* (2013.01); *B01J 20/3236* (2013.01); *B01J 20/3293* (2013.01); *C01G 49/00* (2013.01); *C01G 49/0072* (2013.01); *C04B 35/62821* (2013.01); *H01F 1/11* (2013.01); *H01F 1/112* (2013.01); *C04B 2235/3206* (2013.01); *C04B 2235/3262* (2013.01); *C04B 2235/3274* (2013.01)

(58) Field of Classification Search
  CPC ................ B01J 20/3042; B01J 20/3028; B01J 20/3204; B01J 20/3236; B01J 20/3293; B01J 20/06; H01F 1/112; H01F 1/11; C01G 49/0072; C01G 49/00
  See application file for complete search history.

(56) References Cited

U.S. PATENT DOCUMENTS

| 7,670,679 | B2* | 3/2010 | Krishna | ................ | B01D 69/02 |
| | | | | | 106/409 |
| 2007/0281160 | A1 | 12/2007 | Krishna et al. | | |
| 2012/0234768 | A1 | 9/2012 | Fukaya et al. | | |
| 2016/0070193 | A1 | 3/2016 | Aga | | |

FOREIGN PATENT DOCUMENTS

| EP | 3032335 A1 | 6/2016 |
| JP | S53076544 A | 7/1978 |
| JP | S56105401 A | 8/1981 |
| JP | S61210997 A | 9/1986 |
| JP | H02038318 A | 2/1990 |
| JP | H03020002 A | 1/1991 |
| JP | H07330422 A | 12/1995 |
| JP | H10182264 A | 7/1998 |
| JP | 2005199163 A | 7/2005 |
| JP | 2007320847 A | 12/2007 |
| JP | 201206106 A | 10/2012 |
| JP | 2014182304 A * | 9/2014 |
| WO | 2015108149 A1 | 7/2015 |

OTHER PUBLICATIONS

Machine translation for CN103046138A (Year: 2013).*
Machine translation for JP 2014182304 (Year: 2006).*
Supplementary European Search Report in Application No. 16743302.8 dated Jun. 6, 2018.
Mao-Xiang Jing, et al. "Magnetic Core-Shell Nano-TiO2/Al2O3/NiFe2O4 Microparticles with Enhanced Photocatalytic Activity," 13 J. Nanosci. and Nanotech. 4949 (2013).
International Search Report from Japanese Patent Application No. PCT/JP2016/052030 dated Mar. 22, 2016.

* cited by examiner

FERRITE PARTICLES HAVING OUTER SHELL STRUCTURE USED FOR FILTERING MEDIUM

TECHNICAL FIELD

The present invention relates to ferrite particles for a filtering medium, and more specifically to ferrite particles for a filtering medium excellent in filtration ability, and a filtering medium.

BACKGROUND ART

Ferrite particles are used in various applications. Patent Document 1 (Japanese Patent Laid-Open No. 7-330422) discloses a water quality activating ceramic using ferrite powder as auxiliary material. The ceramic is used as a filtering medium in various devices.

Patent Document 1 discloses that the ferrite particles are used as a filtering medium. However, the ferrite particles are not focused on various properties of individual ferrite particles, do not have a small apparent density with various properties maintained in the controllable state, and do not fill a specified volume with a small amount. So, the filtering medium is not sufficient in the filtration ability.

Patent Document 2 (Japanese Patent Laid-Open No. 2007-320847) discloses products containing a plurality of core-shell ceramic fine particles comprising a core fine particle structure containing a plurality of primary fine particles and a plurality of primary pores and a shell surrounding at least a part of the core fine particle structure. The products include a membrane, a sensor, an electrode, and a getter.

The core-shell ceramic fine particles disclosed in Patent Document 2 include a core of yttrium stabilized zirconia and a shell of lanthanum ferrite. Since lanthanum ferrite is used as the shell, the ferrite particles do not have a small apparent density with various properties maintained in the controllable state and do not fill a specified volume with a small amount.

DOCUMENTS CITED

Patent Documents

Patent Document 1: Japanese Patent Laid-Open No. 7-330422
Patent Document 2: Japanese Patent Laid-Open No. 2007-320847

SUMMARY OF THE INVENTION

Problems to be Solved

An object of the present invention is to provide ferrite particles for a filtering medium having a small apparent density, various properties are maintained in a controllable state and a specified volume is filled with a small amount, and is excellent in filtration ability, and a filtering medium made from the ferrite particle.

Means to Solve the Problem

Through extensive investigation to solve the problems described above, the present inventors thought out that ferrite particles provided an outer shell structure containing Ti oxide can achieve the object, and the present invention was accomplished. The present invention was performed based on the knowledge.

The present invention provides ferrite particles for a filtering medium provided an outer shell structure containing Ti oxide.

The ferrite particles according to the present invention is preferable to be that the thickness of the outer shell structure is 0.5 to 10 μm.

The ferrite particles according to the present invention is preferable that density of the internal part is smaller than that of the outer shell structure.

The ferrite particles according to the present invention is preferable that the volume average particle diameter is 10 to 100 μm.

The present invention provides a filtering medium made from the ferrite particles.

Advantages of the Invention

The ferrite particles according to the present invention have a small apparent density and fill a specified volume with a small amount, and have various properties maintained in the controllable state because the ferrite particles are provided the outer shell structure containing titanium. As a result, excellent filtration performance is achieved if the ferrite particles are used as a filtering medium.

PREFERRED EMBODIMENTS OF THE INVENTION

The embodiments of the present invention will be described in the following.

<Ferrite Particles According to the Present Invention>

The ferrite particles according to the present invention is provided an outer shell structure containing titanium. So, the ferrite particles is small in apparent density, and various properties are maintained in the controllable state. In addition, the ferrite particles fill a specified volume with a small amount. The words "ferrite particles" in the present invention refer to a mass of individual ferrite particles unless otherwise noted, and the word "particles" refer to individual ferrite particles.

The outer shell structure should be visually recognized in the cross-sectional SEM image of ferrite particles embedded in a resin. More specifically, the outer shell structure provided on the outer periphery should have a thickness in a certain range, and occupy 80% or more of the circumferential length. The proportion of the outer shell structure in the circumferential length is preferable to be 90% or more.

Thickness of the outer shell structure is preferable to be 0.5 to 10 μm to achieve the intended object. If the thickness of the outer shell structure is less than 0.5 μm, the ferrite particles may be weak in mechanical strength and the various inherent powder properties may not be achieved due to breakage. In particular, if the ferrite particles break in use as a carrier, scratches on a photo conductor drum may generate. If the thickness of the outer shell structure exceeds 10 μm, the ferrite particles having the outer shell structure have no difference from conventional ferrite particles, i.e. no desired effect may be achieved. The thickness of the outer shell structure is more preferable to be 0.5 to 8 μm, most preferable to be 0.5 to 6.5 μm.

Figure 1:
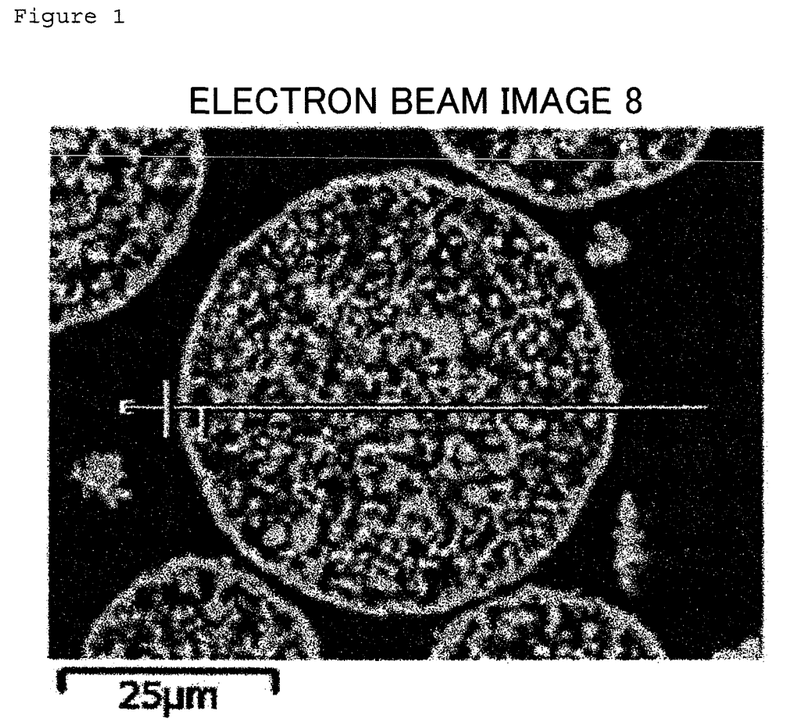
FIG. 1 is the electron micrograph (×200) on the cross section of the ferrite particles according to the present invention, showing the method of determining the thickness of the outer shell structure.
Figure 2:
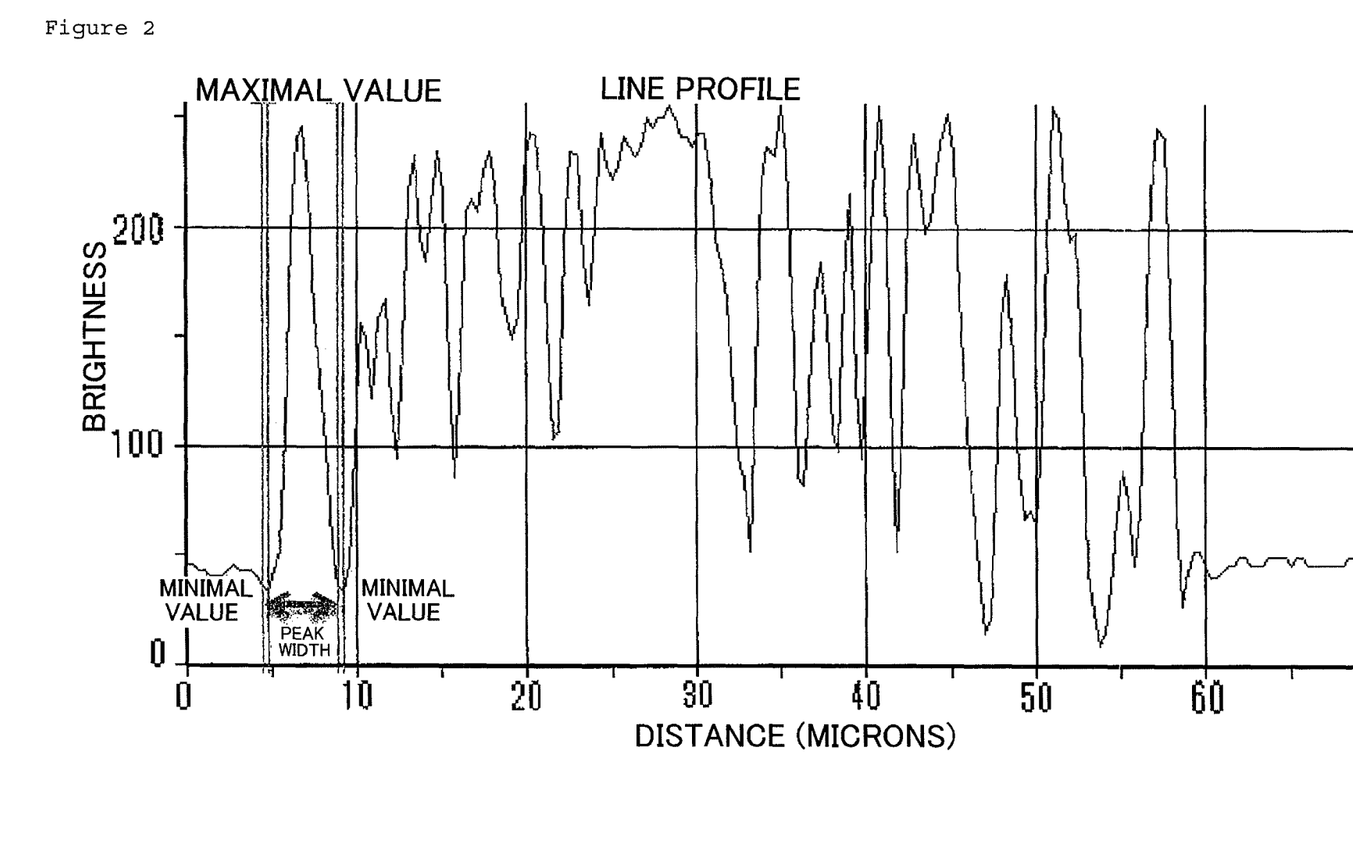
FIG. 2 is the image analyzed graph of FIG. 1.
Figure 3:
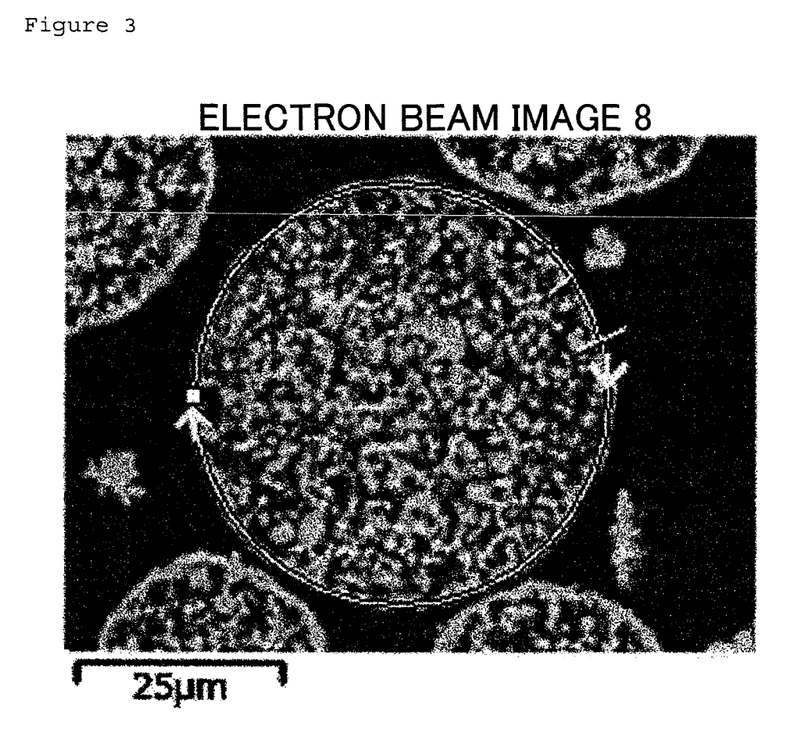
FIG. 3 is the cross-sectional electron micrograph (×200) of the ferrite particle according to the present invention, showing the method of determining the proportion of the outer shell structure in outer periphery.
Figure 4:
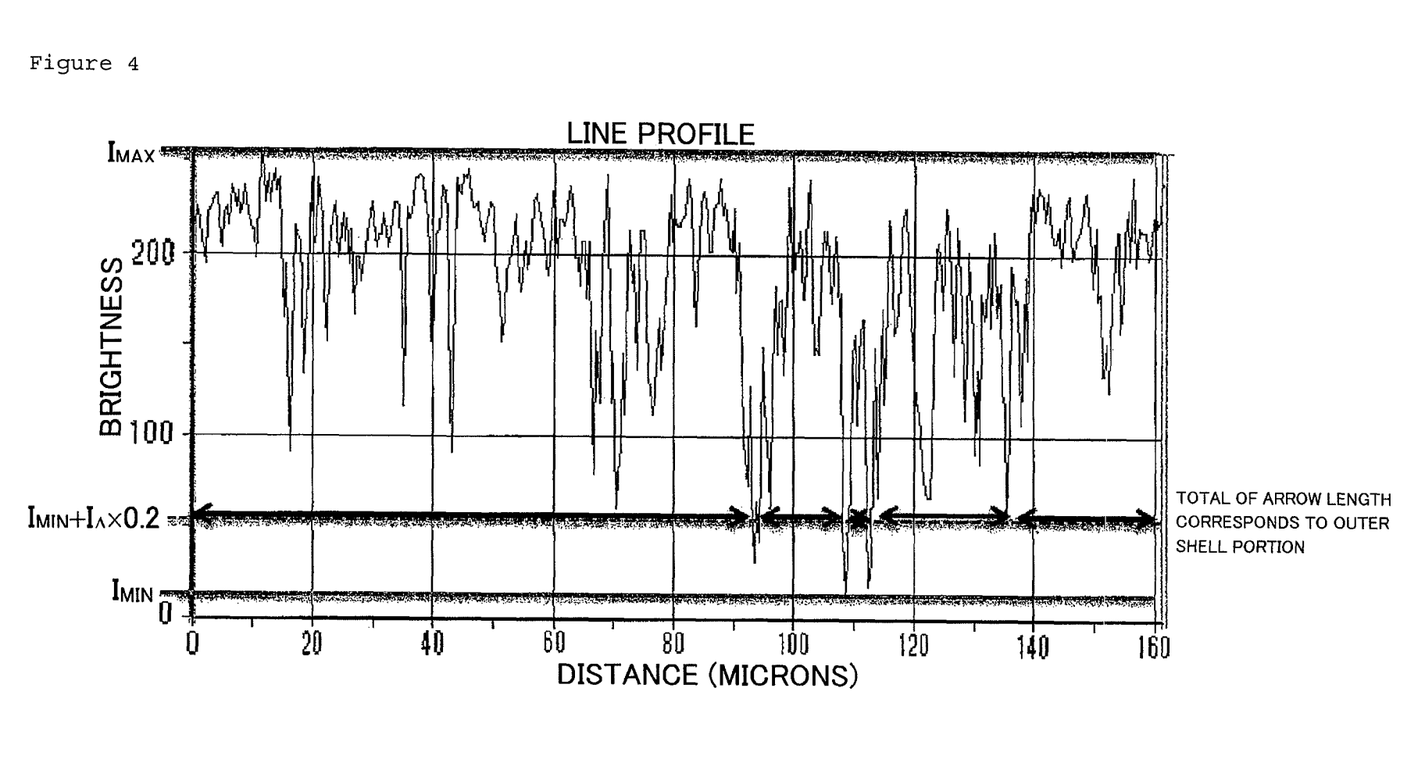
FIG. 4 is the image analyzed graph of FIG. 3.

The thickness of the outer shell structure is determined by observing the cross-section of ferrite particles embedded in a resin with SEM and image-processing the image as shown in FIGS. 1 and 3, and the method will be described later in detail.

<Determination of the Thickness of the Outer Shell Structure>

The thickness of the outer shell structure of the ferrite particles is examined by the following procedures.

The ferrite particles are embedded in a resin, the cross section is polished with the polishing machine and subjected to gold vapor deposition to prepare the specimen for observing the cross section (for determining the thickness of the outer shell structure with SEM). SEM image of the specimen is photographed with JSM-6060A manufactured by JEOL Ltd., with the accelerating voltage of 5 kV, the visual field of 200 magnifications. The image data is introduced into the image analyzing software (Image-Pro PLUS) manufactured by Media Cybernetics Inc., through an interface for analyzing. More specifically, after adjusting the contrast of the image, the brightness of the image is extracted for each particle by the line profile function of the analyzing software. On this occasion, the straight line profile passing through the approximate center of the particle in the horizontal direction is drawn. Among the peaks present in the profile, the peak corresponding to the outer shell structure is sandwiched between two markers, and the width between the two markers is determined to be the thickness of the outer shell structure. The peak is defined by the maximum values between the minimum values in the line profile. The contrast is preferable to be adjusted to make brightness of the embedding resin portion (corresponding to background) 50% or less of the maximum brightness. The same procedures are carried out on 30 particles in the same manner, and the average is determined to be the thickness of the outer shell structure.

The proportion of the outer shell structure in the circumferential length is determined from the cross-sectional image of ferrite particles embedded in the resin observed with SEM and image-processing the image as shown in FIGS. 1 and 3.

<Determination of Proportion of the Outer Shell Structure in Outer Peripheral Direction>

The image is processed in the same manner as described above, and a line profile of circular or free-form curve (closed curve) is set for the outer shell structure of the particles. On this occasion, if the maximum brightness of the profile is represented by $I_{max}$, the minimum brightness is represented by $I_{min}$, and the difference between the maximum brightness and the minimum brightness is represented by $I_A$, the range from $I_{min}$ or more to less than $I_{min}+I_A\times0.2$ is determined as the portion having no outer shell structure, and the range from $I_{min}+I_A\times0.2$ or more to $I_{max}$ or less is determined as the outer shell portion. Among the brightness data in the line profile length (circumferential length) obtained by the line profile function, the line profile lengths having the brightness of $I_{min}+I_A\times0.2$ or more to $I_{max}$ or less are integrated and divided by the line profile length (circumferential length), and the proportion of the outer periphery having the thickness in the certain range can be determined by the calculation. The same procedures are carried out for 30 particles, and the average is assumed to be the proportion of the outer periphery in the circumferential length (=density of the outer periphery).

(Determination of Proportion of Porous Portion in Internal Part of Particle)

The same image processing as described above is carried out with the straight line profile set to pass through the approximate center of each particle. On this occasion, if the maximum brightness of the profile is represented by $I_{max}$, the minimum brightness is represented by $I_{min}$, and the difference between the maximum brightness and the minimum brightness is represented by $I_A$, the range from $I_{min}$ or more to less than $I_{min}+I_A\times0.2$ is determined as the portion without ferrite, and the range from $I_{min}+I_A\times0.2$ or more to $I_{max}$ is determined as the portion of ferrite. Among the brightness data in the line profile length (straight line) obtained by the ling profile function, the line profile lengths having the brightness of $I_{min}+I_A\times0.2$ or more to $I_{max}$ or less are integrated and divided by the line profile length (straight line) to determine the proportion of the ferrite portion in the internal part of the particle by the calculation. The same procedures are carried out for 30 particles, and the average is assumed to be the density of the internal part of the particle.

Making of the apparent density of conventional ferrite particles low has mainly been achieved by making ferrite particles porous only. Making of ferrite particles porous can be easily achieved by changing firing conditions in final firing. However, characteristic pores in porous material are uniformly formed in the whole region from the surface to the internal part. As a result, if the properties should be controlled by resin coating or resin impregnation, the control of properties is extremely difficult due to the large effect of the resin used in the coating or the impregnation because a large amount of the resin presents on the surface of the particles.

Although the shape of the ferrite particles according to the present invention is similar to that of the conventional spherical particles at a first glance, the density of the ferrite particles are different between the outer shell structure and the internal part of the ferrite particle having a porous structure. More specifically, the ferrite particle has a large pore volume because the density of the internal part of the particles is small and the pore diameter is large because the density of the outer shell structure is large. In addition, as the outer shell structure is provided, the particle has smaller apparent density in comparison with the conventional porous particles. Further, as the outside of ferrite particles is connected to the internal part through localizing pores, the internal part of the particle is impregnated with the suspension including dispersed resin or functional nanoparticles with the surface exposed, even the apparent density is small. As a result, as the outer shell structure and the internal porous portion can have individual functions, properties which have not been achieved in the conventional ferrite particles is achieved.

The ferrite particles according to the present invention is preferable to contain 0.5 to 4 wt % of Mg and 3 to 20 wt % of Mn.

The ferrite particles according to the present invention is preferable to contain 47 to 70 wt % of Fe.

The ferrite particles according to the present invention is preferable to contain 0.5 to 4.5 wt % of Ti.

If the ferrite particles according to the present invention contain Mg, the magnetization control in the ferrite particles is made easy. If Mg content is less than 0.5 wt %, the effect of Mg is weak and the magnetization control is not sufficient.

If Mg content exceeds 4 wt %, the magnetization decreases and use in applications based on magnetic properties is made difficult.

If the ferrite particles according to the present invention contain Mn, the magnetization control and the electric resistivity control of the ferrite particles is made easy. If Mn content is less than 3 wt %, the effect of Mn is weak, and the magnetization control is not sufficient. If Mn content exceeds 20 wt %, the amount is close to the stoichiometry of Mn ferrite, and the effect of Mn decreases to make Mn content meaningless. If Mn is contained, firing temperature controls the magnetization even at the specific oxygen concentration.

If both of Mn and Mg is contained, it is preferable from the viewpoint of precise control of firing temperature and magnetization. In other words, the magnetization of ferrite particles is roughly controlled by the content of Mg, and Mn content control the relation between firing temperature and magnetization more precise.

If the ferrite particles contain Mg in use as a carrier for an electrophotographic developer, the developer composed of a ferrite carrier composed of the ferrite particles and full-color toners is excellent in charging start. In addition, the electric resistivity is made large. If Mg content is less than 0.5 wt %, sufficient effect of Mg is not achieved and the resistivity decreases to worsen the image quality by generation of fogging and poor gradation. If the carrier is used for electrophotographic developer, excessively large magnetization harden the tip of a magnetic brush to generate image defects such as brush streak marks. If Mg content exceeds 4 wt %, not only the ferrite carrier scattering occurs due to smaller magnetization, but also the moisture adsorption increases due to the effect of hydroxyl group originating from Mg if the firing temperature is low. As a result, the environmental dependency of electrical properties such as the charge amount and the resistivity are made poor.

If Fe content in the ferrite particles according to the present invention is less than 47 wt %, no outer shell structure is provided. If Fe content exceeds 70 wt %, no effect of containing Mg is achieved, and the ferrite particles might be the magnetite.

The ferrite particles according to the present invention is preferable to contain 0.5 to 4.5 wt % of Ti. As Ti lowers the firing temperature, not only the aggregated particles are reduced, but also uniform and wrinkled surface properties is achieved. If Ti content is less than 0.5 wt %, no effect of containing Ti is achieved, and the ferrite particles without the outer shell structure is prepared. Ti content of exceeding 4.5 wt % is not preferable because use in applications based on magnetic properties of ferrite particles is made difficult even the outer shell structure is provided.

The difference between the Ti content in the ferrite particles according to the present invention and the Ti content in ferrite particles without the outer shell structure, i.e., the difference in Ti content between the vicinity of the surface of particle and the internal part of particle, is preferable to be 0.5 to 4.5 wt %.

If difference in Ti content is less than 0.5 wt %, no outer shell structure can be formed due to the small coating amount of composite oxide particles. If difference exceeds 4.5 wt %, the magnetization tends to decrease, and is not preferable because use in applications based on magnetic properties is made difficult.

The Ti oxides contained in the outer shell structure can be confirmed by EDX elemental mapping analysis of the cross-sectional SEM sample. Ti oxides include not only $TiO_2$ but also compounds, solid solution of one or more elements constituting the matrix of ferrite particle such as Fe—Ti oxides, Mg—Ti oxides, Sr—Ti oxides, Mn—Ti oxides, Mg—Fe—Ti oxides, Mg—Mn—Ti oxides, Sr—Fe—Ti oxides, Sr—Mn—Ti oxides, Sr—Mg—Ti oxides, Fe—Mn—Ti oxides, Fe—Mn—Mg—Ti oxides, Sr—Mn—Mg—Ti oxides, Sr—Fe—Mg—Ti oxides, and Sr—Fe—Mn—Ti oxides.

The ferrite particles according to the present invention is preferable to contain 0 to 1.5 wt % of Sr. Sr not only contributes to adjusting the electric resistivity and the surface properties with the large magnetization, but also has an effect of enhancing the charging ability in the ferrite particles. The effect is particularly large in combination with Ti. If Sr content exceeds 1.5 wt %, as the residual magnetization and the coercive force increase, use in applications based on soft magnetic properties is made difficult.

<Determination of Content of Fe, Mg, Ti and Sr>

The contents of Fe, Mg, Ti and Sr are determined as follows.

Ferrite particles (ferrite carrier core material) in an amount of 0.2 g is weighed and completely dissolved in 60 ml of pure water with addition of 20 ml of 1 N hydrochloric acid and 20 ml of 1 N nitric acid with heating. The content of Fe, Mg, Ti and Sr in the aqueous solution is determined by using the ICP analyzer (ICPS-1000IV manufactured by Shimadzu Corporation).

The ferrite particle according to the present invention is preferable to have the magnetization of 55 to 85 $Am^2/kg$ in the applied magnetic field of 5K·1000/4π·A/m in the VSM examination. If the magnetization of the ferrite particles is less than 55 $Am^2/kg$ at 5K·1000/4π·A/m, use in applications based on the magnetic properties is made insufficient. The magnetization of ferrite particles having the composition according to the present invention never exceed 85 $Am^2/kg$ at 5K·1000/4π·A/m.

<Determination of the Magnetic Properties>

The magnetic properties are examined with the vibrating sample magnetometer (model: VSM-C7-10A (manufactured by Toei Industry Co., Ltd.)). The cell having the inner diameter of 5 mm and the height of 2 mm is filled with the ferrite particles and set in the apparatus. In the examination, applied magnetic field is swept up to 5K·1000/4π·A/m. Then, the applied magnetic field is reduced to draw the hysteresis curve on the recording paper. Based on the hysteresis curve, the magnetization under the applied magnetic field of 5K·1000/4π·A/m is determined. The residual magnetization and the coercive force are determined in the same manner.

The volume average particle diameter of the ferrite particles according to the present invention examined by a laser diffraction particle size distribution examiner is preferable to be 10 to 100 μm, more preferable to be 15 to 50 μm, most preferable to be 20 to 50 μm. If the volume average particle diameter of the ferrite particles is less than 10 μm, as the portion small in the density in the internal part of ferrite particles decreases relatively, ferrite particles having the sufficiently small apparent density may not be prepared. Although the outer shell structure may be provided on the ferrite particles having the volume average particle diameter exceeding 100 μm, the diameter is preferably 100 μm or less from the viewpoint of reducing voids in densely filled specified volume.

<Determination of the Volume Average Particle Diameter>

The volume average particle diameter is examined by the laser diffraction/scattering method. The micro track particle size analyzer (Model 9320-X100) manufactured by Nikkiso Co., Ltd is used as the apparatus. The refractive index is assumed to be 2.42, and the examination is carried out under the environment at 25±5° C. and the relative humidity of 55±15%. The volume average particle diameter (median diameter) refers to the volume cumulative 50% particle diameter under the sieve in the volume distribution mode. Water is used as dispersion medium.

BET specific surface area of the ferrite particles according to the present invention is preferable to be 0.2 to 1 $m^2/g$, more preferable to be 0.2 to 0.85 $m^2/g$.

BET specific surface area of less than the range is not preferable because the ferrite particles have the internal part densely filled without sufficient outer shell structure. If BET specific surface area exceeds the range, porous ferrite particles without the outer shell structure are prepared. Note that in examination of BET specific surface area, the examination results may be influenced by the moisture on the surface of the ferrite particles. So, the pre-treatment is preferable to remove the moisture put on the surface of the ferrite particles as much as possible.

<Determination of BET Specific Surface Area>

The BET specific surface area is examined with the BET specific surface area analyzer (Macsorb HM model 1208 (manufactured by Mountech Co.)). The ferrite particles in an amount of about 5 to 7 g is placed in the standard sample cell for the exclusive use in the specific surface area analyzer and weight of the ferrite particles is accurately weighed with an analytical balance. The ferrite particles in the standard sample cell is set in the examination port to start the examination. The examination is carried out by the one-point method. After finishing the examination, input of the weight of the ferrite particles starts calculation of BET specific surface area automatically. As a pre-treatment before examination, the ferrite particles in an amount of about 20 g is taken onto a medicine wrapping paper and then degassed to −0.1 MPa with a vacuum dryer. After reaching the degree of vacuum −0.1 MPa or less, the ferrite particles is heated at 200° C. for 2 hours.

Environment: temperature at 10 to 30° C., relative humidity at 20 to 80%, without condensation.

The electric resistivity of the ferrite particles according to the present invention at an applied voltage of 50 V for a 6.5-mm gap is preferable to be $5 \times 10^7$ to $1 \times 10^{11}$ Ω.

If the electric resistivity of the ferrite particles is less than $5 \times 10^7$ Ω at an applied voltage of 50 V with the 6.5-mm gap, the ferrite composition may be close to magnetite, or providing of the outer shell structure is not sufficient because of less amount of Ti oxide. If the electric resistivity of the ferrite particles exceeds $1 \times 10^{11}$ Ω, Ti content in the outer shell structure of ferrite particles is too much and the magnetization may be poor.

<Determination of the Electric Resistivity>

The electric resistivity is determined as follows.

Non-magnetic parallel plate electrodes (10 mm by 40 mm) are opposed with the 6.5-mm gap, and the gap is filled with 200 mg of ferrite particles weighed. The magnet (surface magnetic flux density: 1500 Gauss, magnet area in contact with electrode: 10 mm by 30 mm) is attached to the parallel plate electrodes to hold the ferrite particles between the electrodes. Voltages of 50 V, 100 V, 250 V, 500 V and 1000 V are applied to examine the electric resistivity at the applied voltages with the insulation resistivity meter (SM-8210 manufactured by DKK-TOA Corporation).

The ferrite particles is preferable to have the pore volume of 0.06 to 0.2 ml/g (60 to 200 μl/g) and the peak pore diameter of 0.7 to 2 μm.

If the pore volume of ferrite particles is less than 0.06 ml/g (60 μl/g), the apparent density of the ferrite particles is not small because the pores in the internal part of the ferrite particles are small. If the pore volume of ferrite particles exceeds 0.2 ml/g (200 μl/g), the apparent density is excessively small to cause problems in applications based on magnetic properties of the ferrite particles because the magnetic force of the ferrite particle as a magnetic powder is poor.

If the peak pore diameter of the ferrite particles exceeds 2 μm, the apparent density of the ferrite particles is not small and sufficient properties may not be achieved in applications utilizing the portion having the small density in the internal part of the ferrite particles. If the peak pore diameter of ferrite particles is less than 0.7 μm, the ferrite particles might be porous without the outer shell structure, and use in applications separately utilizing functions of the internal part and outer shell structure of the ferrite particles may be made difficult.

If the pore volume and the peak pore diameter are in the ranges, the suitably light weighted ferrite particles without problems described above are prepared.

<Determination of the Pore Diameter and the Pore Volume of Ferrite Particles>

The pore diameter and the pore volume of the ferrite particles are determined as follows. Mercury porosimeters Pascal 140 and Pascal 240 (manufactured by Thermo Fisher Scientific Inc.) are used in the examination. Using CD3P (for powder use) as the dilatometer, the ferrite particles put in the commercially available gelatinous capsule having the plurality of open holes is placed in the dilatometer. The first run for the examination in a low-pressure region (0 to 400 kPa) includes the steps, degassing of Pascal 140, filling of mercury. The second run repeats the steps in the low-pressure region. After finishing the second run, the total weight of the dilatometer, mercury, the capsule and the ferrite particles is examined. Then, the examination in the high-pressure region (0.1 MPa to 200 MPa) is carried out using Pascal 240. Based on the amount of mercury press fitted in the examination, the pore volume, the pore diameter distribution, and the peak pore diameter of the ferrite particles are determined. In the calculation for determining the pore diameter, the surface tension of mercury is assumed to be 480 dyn/cm and the contact angle is assumed to be 141.3°.

<Manufacturing Method of the Ferrite Particles According to the Present Invention>

The method of manufacturing the ferrite particles according to the present invention will be described below.

The method of manufacturing the ferrite particles according to the present invention is carried out as follows, for example.

(Preparation of Particles for the Ferrite Core Material)

The compounds of Fe, Mn and Mg, and the compounds of Sr, Ti according to needs are pulverized, mixed, calcined, and pulverized with the rod mill to prepare the calcined ferrite powder.

The preferable composition of the calcined ferrite powder is 45 to 68 wt % of Fe, 0.5 to 4 wt % of Mg, 3 to 22 wt % of Mn, 0.25 to 6 wt % of Ti, and 0 to 2 wt % of Sr, for example.

If the calcined ferrite powder satisfies the composition described above, various properties necessary and sufficient for ferrite particles corresponding to applications are achieved by coating with Ti compounds followed by firing.

Water, and a dispersant and a binder according to needs are added to the calcined ferrite powder to prepare the slurry. After viscosity adjustment of the slurry, granulation is carried out using the spray dryer. The granulated particle are subjected to binder removing to prepare the uncoated ferrite particle. The binder removing is carried out at 600 to 1000° C.

The slurry particle diameter $D_{50}$ of the slurry is preferable to be 0.5 to 4.5 µm. If the slurry particle diameter is in the range, the ferrite particles having the desired BET specific surface area is prepared. If the slurry particle diameter $D_{50}$ is less than 0.5 µm, the specific surface area of the calcined ferrite powder might be excessively large after pulverization, and excess firing proceeds in firing of the ferrite particles coated with $TiO_2$ particles for coating. As a result, the desired BET specific surface area is hardly achieved in the ferrite particles. If the slurry particle diameter $D_{50}$ exceeds 4.5 µm, desired ferrite particles may not be prepared due to insufficient formation of the outer shell structure even the ferrite particles coated with $TiO_2$ particles for coating are fired.

The slurry particle diameter in the range may be achieved by controlling the pulverization time in preparation of the slurry for the granulation, selecting the pulverization medium to prepare the intended slurry particle diameter and particle size distribution, or classifying the raw material particles in the slurry with the wet cyclone. If the wet cyclone is employed, as the solid content in the slurry changes after classification, solid content should be adjusted. However, as the wet cyclone achieves the intended slurry diameter in a short time, the wet cyclone may be used in combination with the controlled pulverization time.

The volume average particle diameter of the $TiO_2$ particles for coating is preferable to be 0.05 to 3 µm. If the particle diameter is less than 0.05 µm, the $TiO_2$ particles for coating tend to aggregate if the $TiO_2$ particles for coating are intended to attach on the surface of the uncoated ferrite particle. As a result, the ferrite particles may include a part without the outer shell structure even the surface of the uncoated ferrite particle is coated with the desired amount of the $TiO_2$ particles for coating because the coated layer is irregular. If the particle diameter exceeds 3 µm, uniform attaching of the $TiO_2$ particles for coating on the uncoated ferrite particle is made difficult, and the ferrite particles may include the part without outer shell structure.

The amount of the $TiO_2$ particles for coating is preferable to be 0.8 to 7 wt % relative to the uncoated ferrite particle. However, the amount depends on the volume average particle diameter. If the amount is less than 0.8 wt %, sufficient electric resistivity cannot be achieved after final firing. If the amount exceeds 7 wt %, the $TiO_2$ particles for coating not attached on the uncoated ferrite particle may aggregates each other and the ferrite particles small in magnetization may generate. Small magnetization may cause problems in applications based on magnetic properties of the ferrite particles.

(Preparation of the Ferrite Particles)

To the uncoated ferrite particle, $TiO_2$ particles for coating are added and mixed with the mixing mill to prepare the raw material for ferrite particles. The raw material for ferrite particles is subjected to final firing at 850 to 1230° C. under the inert atmosphere or the weak oxidizing atmosphere such as the nitrogen atmosphere or the mixed gas atmosphere of nitrogen and oxygen with an oxygen concentration of 3 vol % or less.

The fired material is pulverized and classified to prepare the ferrite particles. The particle size is adjusted to the desired particle diameter by the conventional classification method such as wind classification, mesh filtration and sedimentation. If the dry collection is employed, the collection may be carried out with the cyclone.

The ferrite particles according to the present invention having the properties is thus prepared.

In the ferrite particles according to the present invention, surface treatment for electro static charge may be carried out to make dispersion of the $TiO_2$ particles for coating to be attached on the surface of the particles for the ferrite core material easy. The surface treatment for electro static charging reduces the aggregation of the $TiO_2$ particles for coating. As a result, attaching of the $TiO_2$ particles for coating is made easy. In addition, if the surface treatment agent having the reverse polarity to the charging polarity of the particles for the ferrite core material is used, the surface treatment prevents the detachment of the $TiO_2$ particles for coating attached on the particles for the ferrite core material.

The method of attaching the $TiO_2$ particles for coating on the surface of the uncoated ferrite particle is described above. If the dry method of attaching the $TiO_2$ particles for coating without subjected to the pre-treatment for electro static charging on the surface of the uncoated ferrite particle, the $TiO_2$ particles for coating might be in severe aggregation, and the situation causes difficulty in attaching on the particles for the ferrite core material or results large deviation in the composition because the large aggregates attach. So, the properties of the finally fired ferrite particles may be poor.

If the wet method is employed for coating of the $TiO_2$ particles for coating on the surface of particles for the ferrite core material, as the removal of the solvent for the whole raw materials for the particles for the ferrite core material is required, the large-scale processing required is expensive. If the dry method is employed for coating of the $TiO_2$ particles for coating on the particles for the ferrite core material, just the surface treatment on the $TiO_2$ particles for coating is required, and is easily carried out with less cost.

<Filtering Medium According to the Present Invention>

A filtering medium excellent in filtration performance is prepared from the ferrite particles according to the present invention.

The present invention will be more specifically described with reference to Examples and Comparative Examples.

Example 1

<Preparation of the Ferrite Particles>

100 mol of $Fe_2O_3$, 10 mol of $MgCO_3$, 13.3 mol of $Mn_3O_4$ and 1 mol of $SrCO_3$ are weighed, and 1.35 wt % relative to the raw material weight of carbon black as the reducing agent are mixed and pulverized, followed by pelletizing with the roller compactor to prepare the pellets. The pellets were calcined in the rotary calcination furnace at 980° C. under the nitrogen atmosphere with the oxygen concentration of 0 volt. The calcined material was pulverized with the rod mill to prepare the calcined ferrite powder for the ferrite core material.

The calcined ferrite powder for the ferrite core material was pulverized for 1 hour with the wet bead mill. PVA as the binder component was added in an amount of 1 wt % relative to the slurry solid content, and the polycarboxylic acid-based dispersant was added to adjust the slurry viscosity to be 2 to 3 poise. The slurry particle diameter $D_{50}$ was 3.259 µm.

The pulverized slurry was granulated and dried with the spray dryer, and subjected to the binder removing treatment at 850° C. with the rotary kiln under the nitrogen atmosphere with the oxygen content of 0 vol %, and the particles for the ferrite core material were prepared.

The particles for a ferrite core material was added 4 wt % of the $TiO_2$ particles for coating, and mixed and stirred for 10 minutes with the mixing mill. The aggregates of the mixture were loosened with an 80-mesh vibrating sieve to prepare the raw material for the ferrite particles.

The raw material for ferrite particles was kept at 1010° C. for 4 hours under the nitrogen atmosphere with the oxygen content of 0 vol % in the electric furnace for final firing. The fired material was de-agglomerated and classified to prepare the ferrite particles.

Example 2

The ferrite particles were prepared in the same manner as in Example 1, except that 100 mol of $Fe_2O_3$, 5 mol of $MgCO_3$, 26.6 mol of $Mn_3O_4$, and 0 mol of $SrCO_3$ were weighed Example 3

The ferrite particles were prepared in the same manner as in Example 1, except that 100 mol of $Fe_2O_3$, 20 mol of $MgCO_3$, 6.65 mol of $Mn_3O_4$, and 0 mol of $SrCO_3$ were weighed.

Example 4

The ferrite particles were prepared in the same manner as in Example 1, except that 100 mol of $Fe_2O_3$, 5 mol of $MgCO_3$, 5 mol of $Mn_3O_4$, and 0 mol of $SrCO_3$ were weighed.

Example 5

The ferrite particles were prepared in the same manner as in Example 1, except that 100 mol of $Fe_2O_3$, 20 mol of $MgCO_3$, 26.6 mol of $Mn_3O_4$, and 0 mol of $SrCO_3$ were weighed.

Example 6

The ferrite particles were prepared in the same manner as in Example 1, except that 0 mol of $SrCO_3$ was weighed and 2.5 wt % of $TiO_2$ particles for coating was added to the calcined ferrite powder.

Example 7

The ferrite particles were prepared in the same manner as in Example 1, except that 0 mol of $SrCO_3$ was weighed and 5 wt % of $TiO_2$ particles for coating was added to the calcined ferrite powder.

Example 8

The ferrite particles were prepared in the same manner as in Example 6, except that the final firing temperature was 950° C.

Example 9

The ferrite particles were prepared in the same manner as in Example 6, except that the final firing temperature was 1050° C.

Comparative Example 1

The ferrite particles were prepared in the same manner as in Example 1, except that the amount of $SrCO_3$ was 0 mol and the final firing temperature was 920° C.

Comparative Example 2

The ferrite particles were prepared in the same manner as in Example 1, except that the amount of $SrCO_3$ was 0 mol and no $TiO_2$ particle for coating was added to the calcined ferrite powder.

Comparative Example 3

The ferrite particles were prepared in the same manner as in Example 1, except that the amount of $SrCO_3$ was 0 mol and the final firing temperature was 1165° C.

Table 1 shows the blending ratio of the raw materials for the ferrite particles charged (molar ratio of raw material charged), the amount of carbon, the calcination conditions (calcination temperature and calcination atmosphere), the final granulation conditions (slurry particle diameter and amount of PVA added), the binder removing conditions (treatment temperature and treatment atmosphere), the mixing conditions of $TiO_2$ (the amount added and mixing conditions) and the final firing conditions (final firing temperature and final firing atmosphere) in Examples 1 to 9 and Comparative Examples 1 to 3. Table 2 shows the composition, the magnetic properties (magnetization, residual magnetization and coercive force) and the shape of the ferrite particles prepared (cross-sectional shape, proportion of the outer shell structure in the length of circumference, thickness of the outer shell structure, and proportion of ferrite portion in internal part of particle). Table 3 shows the powder properties (BET specific surface area, average particle diameter, apparent density, true density, pore volume and peak pore diameter) and the electric resistance with 6.5 mm-gap (50 V, 100 V, 250 V, 500 V and 1000 V) of the ferrite particles in Examples 1 to 9 and Comparative Examples 1 to 3. The determination methods are as described above.

TABLE 1

| | Ratio of raw material charged (mol) | | | | | Amount of carbon *1 | Calcination condition | | Final granulation condition | |
|---|---|---|---|---|---|---|---|---|---|---|
| | | | | | | | | | Slurry particle | Amount of PVA added (10 wt % |
| | $Fe_2O_3$ | $MgCO_3$ | $Mn_3O_4$ | $TiO_2$ | $SrCO_3$ | (wt %) | Temperature (° C.) | Atmosphere (vol %-$O_2$) | diameter ($D_{50}$) (μm) | aqueous solution) |
| Example 1 | 100 | 10 | 13.3 | 0 | 1 | 1.35 | 980 | 0 | 3.259 | 1 |
| Example 2 | 100 | 5 | 26.6 | 0 | 0 | 1.35 | 980 | 0 | 3.245 | 1 |
| Example 3 | 100 | 20 | 6.65 | 0 | 0 | 1.35 | 980 | 0 | 3.268 | 1 |

TABLE 1-continued

| | | | | | | | | | | |
|---|---|---|---|---|---|---|---|---|---|---|
| Example 4 | 100 | 5 | 5 | 0 | 0 | 1.35 | 980 | 0 | 3.229 | 1 |
| Example 5 | 100 | 20 | 26.6 | 0 | 0 | 1.35 | 980 | 0 | 3.242 | 1 |
| Example 6 | 100 | 10 | 13.3 | 0 | 0 | 1.35 | 980 | 0 | 3.231 | 1 |
| Example 7 | 100 | 10 | 13.3 | 0 | 0 | 1.35 | 980 | 0 | 3.269 | 1 |
| Example 8 | 100 | 10 | 13.3 | 0 | 0 | 1.35 | 980 | 0 | 3.24 | 1 |
| Example 9 | 100 | 10 | 13.3 | 0 | 0 | 1.35 | 980 | 0 | 3.274 | 1 |
| Comparative Example 1 | 100 | 10 | 13.3 | 0 | 0 | 1.35 | 980 | 0 | 3.247 | 1 |
| Comparative Example 2 | 100 | 10 | 13.3 | 0 | 0 | 1.35 | 980 | 0 | 3.236 | 1 |
| Comparative Example 3 | 100 | 10 | 13.3 | 0 | 0 | 1.35 | 980 | 0 | 3.228 | 1 |

| | Binder removing condition | | $TiO_2$ mixing condition | | Final firing condition | |
|---|---|---|---|---|---|---|
| | Temperature (° C.) | Atmosphere (vol %-$O_2$) | Amount added (wt %)*2 | Time (min) | Firing temperature (° C.) | Atmosphere (vol %-$O_2$) |
| Example 1 | 850 | 0 | 4 | 10 | 1010 | 0 |
| Example 2 | 850 | 0 | 4 | 10 | 1010 | 0 |
| Example 3 | 850 | 0 | 4 | 10 | 1010 | 0 |
| Example 4 | 850 | 0 | 4 | 10 | 1010 | 0 |
| Example 5 | 850 | 0 | 4 | 10 | 1010 | 0 |
| Example 6 | 850 | 0 | 2.5 | 10 | 1010 | 0 |
| Example 1 | 850 | 0 | 5 | 10 | 1010 | 0 |
| Example 8 | 850 | 0 | 2.5 | 10 | 950 | 0 |
| Example 9 | 850 | 0 | 2.5 | 10 | 1050 | 0 |
| Comparative Example 1 | 850 | 0 | 4 | 10 | 920 | 0 |
| Comparative Example 2 | 850 | 0 | 0 | 10 | 1010 | 0 |
| Comparative Example 3 | 850 | 0 | 4 | 10 | 1165 | 0 |

*1: Amount relative to the weight of raw material mixture
*2 Weight relative to particles for the ferrite core material

TABLE 2

| | Composition of ferrite particles (ICP) (wt %) | | | | | Magnetic properties at $5\ K \cdot 1000/4\pi \cdot A/m$ (VSM) | | | Shape of ferrite particles | | | Proportion of ferrite in internal part of particle (%) |
|---|---|---|---|---|---|---|---|---|---|---|---|---|
| | | | | | | Magnetization ($Am^2$/kg) | Residual magnetization ($Am^2$/kg) | Coercive force (A/m) | Cross-sectional shape (SEM) | Proportion of the outer shell structure in circumferential length (%) | Thickness of the outer shell structure (μm) | |
| | Fe | Mg | Mn | Ti | Sr | | | | | | | |
| Example 1 | 56.36 | 1.23 | 11.06 | 1.95 | 0.59 | 72.66 | 3.27 | 35.97 | Core-shell form | 92 | 2.42 | 61 |
| Example 2 | 49.51 | 0.54 | 19.43 | 1.95 | 0.00 | 74.30 | 3.34 | 37.39 | Core-shell form | 90 | 1.87 | 55 |
| Example 3 | 60.41 | 2.63 | 5.43 | 1.95 | 0.00 | 67.63 | 3.04 | 33.29 | Core-shell form | 95 | 2.65 | 54 |
| Example 4 | 64.24 | 0.70 | 4.74 | 1.95 | 0.00 | 77.70 | 3.5 | 38.45 | Core-shell form | 96 | 2.53 | 58 |
| Example 5 | 48.01 | 2.09 | 11.84 | 1.95 | 0.00 | 66.64 | 3 | 32.78 | Core-shell form | 85 | 2.16 | 52 |
| Example 6 | 57.66 | 1.25 | 11.31 | 1.24 | 0.00 | 76.28 | 3.43 | 38.61 | Core-shell form | 96 | 2.33 | 65 |
| Example 7 | 56.50 | 1.23 | 11.09 | 2.42 | 0.00 | 71.08 | 3.2 | 35.83 | Core-shell form | 98 | 3.65 | 49 |
| Example 8 | 57.66 | 1.25 | 11.31 | 1.24 | 0.00 | 73.18 | 3.81 | 42.5 | Core-shell form | 95 | 2.4 | 73 |
| Example 9 | 57.66 | 1.25 | 11.31 | 1.24 | 0.00 | 77.66 | 3.05 | 29.3 | Core-shell form | 94 | 2.59 | 45 |
| Comparative Example 1 | 56.96 | 1.24 | 11.18 | 1.95 | 0.00 | 68.38 | 4.23 | 46.22 | Porous | Determination impossible* | Determination impossible* | 73 |
| Comparative Example 2 | 58.87 | 1.28 | 11.55 | 0.00 | 0.00 | 81.70 | 3.68 | 40.3 | Porous | Determination impossible* | Determination impossible* | 65 |
| Comparative Example 3 | 56.96 | 1.24 | 11.18 | 1.95 | 0.00 | 78.56 | 2.98 | 32.31 | Granular | Determination impossible* | Determination impossible* | 96 |

*Absence of outer shell structure.

TABLE 3

| | Properties of ferrite particles | | | | | | | | | |
|---|---|---|---|---|---|---|---|---|---|---|
| | BET specific surface area | Average particle diameter | Apparent density | True density | Pore volume | Peak pore diameter | Electric resistivity (6.5-mm Gap) $\Omega$ | | | | |
| | $(m^2/g)$ | $(\mu m)$ | $(g/cm^3)$ | $(g/cm^3)$ | $(\mu l/g)$ | $(\mu m)$ | 50 V | 100 V | 250 V | 500 V | 1000 V |
| Example 1 | 0.3413 | 29.66 | 1.23 | 4.69 | 131.220 | 0.992 | $2.9 \times 10^9$ | $1.3 \times 10^9$ | $5.4 \times 10^8$ | $2.4 \times 10^7$ | Examination impossible |
| Example 2 | 0.3653 | 29.54 | 1.42 | 4.66 | 137.330 | 0.948 | $8.5 \times 10^8$ | $7.0 \times 10^8$ | $9.5 \times 10^7$ | $6.5 \times 10^6$ | Examination impossible |
| Example 3 | 0.3005 | 29.32 | 1.16 | 4.72 | 120.490 | 1.080 | $3.4 \times 10^9$ | $1.8 \times 10^9$ | $6.4 \times 10^8$ | $3.6 \times 10^7$ | Examination impossible |
| Example 4 | 0.392 | 29.60 | 1.35 | 4.78 | 143.980 | 0.904 | $7.8 \times 10^9$ | $4.3 \times 10^8$ | $2.2 \times 10^6$ | Examination impossible | Examination impossible |
| Example 5 | 0.2926 | 29.29 | 1.51 | 4.63 | 118.360 | 1.100 | $5.6 \times 10^9$ | $3.8 \times 10^9$ | $8.7 \times 10^8$ | $6.2 \times 10^7$ | Examination impossible |
| Example 6 | 0.3823 | 29.74 | 1.21 | 4.73 | 141.580 | 0.919 | $5.8 \times 10^7$ | $3.8 \times 10^7$ | $2.7 \times 10^6$ | Examination impossible | Examination impossible |
| Example 7 | 0.3374 | 29.45 | 1.18 | 4.70 | 130.210 | 1.000 | $1.5 \times 10^{10}$ | $8.5 \times 10^9$ | $7.5 \times 10^7$ | Examination impossible | Examination impossible |
| Example 8 | 0.4724 | 29.58 | 1.01 | 4.73 | 163.150 | 0.798 | $9.0 \times 10^7$ | $6.4 \times 10^7$ | $2.0 \times 10^6$ | Examination impossible | Examination impossible |
| Example 9 | 0.2569 | 29.71 | 1.62 | 4.73 | 108.480 | 1.200 | $3.5 \times 10^9$ | $2.1 \times 10^9$ | $7.2 \times 10^8$ | $1.4 \times 10^7$ | Examination impossible |
| Comparative Example 1 | 0.5766 | 29.42 | 0.97 | 4.86 | 86.460 | 0.498 | $3.8 \times 10^7$ | $6.9 \times 10^6$ | Examination impossible | Examination impossible | Examination impossible |
| Comparative Example 2 | 0.4373 | 29.42 | 1.09 | 4.91 | 74.920 | 0.840 | $1.3 \times 10^7$ | $7.5 \times 10^6$ | $1.6 \times 10^6$ | Examination impossible | Examination impossible |
| Comparative Example 3 | 0.0857 | 29.33 | 2.16 | 4.86 | 10.990 | 0.718 | $6.2 \times 10^8$ | $3.5 \times 10^8$ | $8.5 \times 10^7$ | $2.5 \times 10^7$ | $7.6 \times 10^6$ |

As shown in Table 2, the ferrite particles in Examples 1 to 9 are provided with the outer shell structure.

The ferrite particles prepared in Comparative Example 1 are without the outer shell structure due to the low firing temperature even the porous structure is provided.

The ferrite particles prepared in Comparative Example 2 are without the outer shell structure due to not having added TiO$_2$ particle for coating.

The ferrite particles prepared in Comparative Example 3 are without the outer shell structure due to the high firing temperature.

Example 10

Mesh of the stainless steel made was worked into a circle with a diameter of 125 mm and was set in the Nutsche with the inner diameter of 125 mm excluding the paper filter. The Nutsche filter was set on the filtration bottle. 500 g of the ferrite particles prepared in Example 1 were put and flattened on the mesh. Filtering ability of the ferrite particles is examined through the procedure, 500 cc of methanol dispersion of titanium oxide having the transmittance of 50% with the average particle diameter of 0.13 μm was poured under reduced pressure with the aspirator, after pressure reduction was carried out until no filtrate drops, transmittance of the filtrate passed was examined to evaluate the filtration ability of the ferrite powder. Then, the filtrate in the filtration bottle was thrown away, and the Nutsche keeping the ferrite particles was set on the filtration bottle. Methanol was poured for the second filtration and the transmittance of the filtrate was examined in the same manner as in the first time.

Comparative Example 4

The transmittance of the filtrate was evaluated in the same manner as in Example 10, except that the ferrite particles prepared in Comparative Example 1 was used.

Comparative Example 5

The transmittance of the filtrate was evaluated in the same manner as in Example 10, except that the ferrite particles prepared in Comparative Example 2 was used.

Comparative Example 6

The transmittance of the filtrate was evaluated in the same manner as in Example 10, except that the ferrite particles prepared in Comparative Example 3 was used.

Table 4 shows the ferrite particles used, the specific surface area determined by the air permeation method and the transmittance in Example 10 and Comparative Examples 4 to 6. The specific surface area determined by the air permeation method and the transmittance in Table 4 were examined as follows.

<Determination of the Specific Surface Area of the Ferrite Particles by the Air Permeation Method>

The specific surface area of the ferrite particles by the air permeation method were determined by examining the specific surface area based on the time required for the air to pass through the ferrite particles packed in the cell. The examination method is suitable for determining the value of the area relatively limited to the surface portion of the ferrite particles. The examination was carried out in accordance with JIS R 5201 (Physical testing methods for cement).

<Determination of the Transmittance>

The transmittance was examined with the spectrophotometer UV-18000 manufactured by Shimadzu Corporation. The wavelength used in the examination was set at 500 nm. The filtration effect of the ferrite particles was determined by the transmittance relative to the transmittance of methanol assumed to be 100%.

TABLE 4

| | Ferrite particle used | Specific surface area examined by air permeation method (m²/g) | Transmittance (%) First time | Transmittance (%) Second time |
|---|---|---|---|---|
| Example 10 | Ferrite particles in Example 1 | 0.1068 | 96.7 | 93.1 |
| Comparative Example 4 | Ferrite particle in Comparative Example 1 | 0.2133 | 85.1 | 62.1 |
| Comparative Example 5 | Ferrite particle in Comparative Example 2 | 0.1861 | 74.2 | 55.2 |
| Comparative Example 6 | Ferrite particle in Comparative Example 3 | 0.0453 | 57.3 | 54.9 |

As shown in Table 4, as high transmittance is achieved in the first filtration in Example 10, the filtration ability of the ferrite particles prepared in Example 1 is confirmed. In Comparative Examples 4 to 6, the transmittance are in the certain degree due to the filtration ability. However, the results are inferior to those in Example 10 because the titanium oxide particles on the surface of ferrite particles may detached from the ferrite particle in the second filtration.

INDUSTRIAL APPLICABILITY

The ferrite particles according to the present invention is small in apparent density due to the outer shell structure provided, and a specified volume is filled with a small amount with various properties maintained in the controllable state. As a result, a filtering medium (filter) made from the ferrite particles have the greatly improved filtration ability.

The invention claimed is:

1. A particle comprising a core and an outer shell, the outer shell comprising a titanium oxide, and the core comprising ferrite;
   wherein an apparent density of the core is smaller than an apparent density of the outer shell.
2. The particle according to claim 1, wherein the thickness of the outer shell is from 0.5 μm to 10 μm.
3. A plurality of particles according to claim 1 having a volume average particle diameter from 10 μm to 100 μm.
4. A filtering medium comprising the particle according to claim 1.
5. A plurality of particles according to claim 2 having a volume average particle diameter from 10 μm to 100 μm.
6. A filtering medium comprising the particle according to claim 2.
7. A filtering medium comprising the particle according to claim 1.
8. A filtering medium comprising the plurality of particles according to claim 3.
9. A filtering medium comprising the plurality of particles according to claim 5.

* * * * *